United States Patent
Qu et al.

(10) Patent No.: US 11,156,384 B2
(45) Date of Patent: Oct. 26, 2021

(54) SOLAR WATER TAKING AND POWER GENERATING DEVICE AND METHOD FOR WATER TAKING AND POWER GENERATING

(71) Applicant: Xi'an Jiaotong University, Shaanxi (CN)

(72) Inventors: Zhiguo Qu, Shaanxi (CN); Qiang Wang, Shaanxi (CN); Di Tian, Shaanxi (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 0 days.

(21) Appl. No.: 16/933,471

(22) Filed: Jul. 20, 2020

(65) Prior Publication Data

US 2021/0190381 A1    Jun. 24, 2021

(30) Foreign Application Priority Data

Dec. 19, 2019    (CN) .......................... 201911321803.6

(51) Int. Cl.
*F24S 10/13*    (2018.01)
*F24S 60/20*    (2018.01)

(52) U.S. Cl.
CPC .............. *F24S 10/13* (2018.05); *F24S 60/20* (2018.05)

(58) Field of Classification Search
CPC .................................. F24S 10/13; F24S 60/20
See application file for complete search history.

(56) References Cited

U.S. PATENT DOCUMENTS

| 3,501,381 | A | * | 3/1970 | Delano | ...................... | C02F 1/14 |
| | | | | | | 202/83 |
| 4,134,393 | A | * | 1/1979 | Stark | ....................... | F24S 23/31 |
| | | | | | | 126/581 |
| 4,151,046 | A | * | 4/1979 | Eidelberg | .................. | C02F 1/14 |
| | | | | | | 202/180 |
| 4,194,949 | A | * | 3/1980 | Stark | ....................... | F24S 23/30 |
| | | | | | | 202/180 |
| 4,210,494 | A | * | 7/1980 | Rhodes | ...................... | C02F 1/14 |
| | | | | | | 203/10 |
| 4,272,268 | A | * | 6/1981 | Greiner | ................... | F24S 80/58 |
| | | | | | | 62/235.1 |

(Continued)

*Primary Examiner* — Avinash A Savani
*Assistant Examiner* — Deepak A Deean
(74) *Attorney, Agent, or Firm* — Panitch Schwarze Belisario & Nadel LLP

(57) ABSTRACT

In a solar water taking and power generating device, a concentrating-cooling plate encloses the opening, and at least one freshwater collecting channel is formed between the seawater tank and the concentrating-cooling plate; a cation exchange membrane includes a semiconductor film body, nanoparticles, and a capillary water-transporting conduit, wherein the semiconductor film body is provided with cation-selective channels; sunlight illuminates the cation exchange membrane and the nanoparticles through the concentrating-cooling plate, so that the first temperature, the first seawater concentration and the first electric potential in the first side are higher than those in the second side, respectively. The evaporated seawater enters the freshwater tank after condensed, and the cations transfer from the first side to the second side to form an ionic current.

10 Claims, 3 Drawing Sheets

(56) References Cited

U.S. PATENT DOCUMENTS

| | | | | |
|---|---|---|---|---|
| 4,326,498 | A * | 4/1982 | Eckland | F24S 10/13 126/567 |
| 4,363,703 | A * | 12/1982 | ElDifrawi | F24S 10/20 203/10 |
| 4,383,891 | A * | 5/1983 | Clavier | C02F 1/14 202/234 |
| 4,756,802 | A * | 7/1988 | Finney | B01D 5/0066 202/172 |
| 7,008,515 | B1 * | 3/2006 | Husson, Jr. | C02F 1/14 202/83 |
| 7,494,572 | B2 * | 2/2009 | Tonkin | C02F 1/448 203/10 |
| 8,083,902 | B2 * | 12/2011 | Al-Garni | B01D 5/006 202/234 |
| 8,673,119 | B2 * | 3/2014 | Lee | B01D 1/0035 203/98 |
| 10,093,552 | B2 * | 10/2018 | Lee | H02S 40/44 |
| 10,150,049 | B2 * | 12/2018 | D'Alba | B01D 3/02 |
| 10,150,050 | B2 * | 12/2018 | Sadegh | B01D 3/085 |
| 10,590,011 | B2 * | 3/2020 | Alkhazraji | C02F 1/14 |
| 10,782,014 | B2 * | 9/2020 | Habib | C02F 1/02 |
| 10,814,245 | B2 * | 10/2020 | Alkhazraji | B01D 5/0066 |
| 10,976,076 | B2 * | 4/2021 | Chen | F22B 1/006 |
| 2011/0120854 | A1 * | 5/2011 | Lee | B01D 1/0035 203/86 |
| 2011/0168235 | A1 * | 7/2011 | Rosa Clot | F24S 30/422 136/246 |
| 2012/0222967 | A1 * | 9/2012 | Oakes | C25B 1/55 205/637 |
| 2012/0298499 | A1 * | 11/2012 | Lee | B01D 3/00 203/10 |
| 2014/0054159 | A1 * | 2/2014 | Bosch I Bosch | B01D 1/0005 203/10 |
| 2015/0353379 | A1 * | 12/2015 | Lee | B01D 3/007 203/10 |
| 2015/0353385 | A1 * | 12/2015 | Wang | B01D 71/62 210/640 |
| 2018/0135850 | A1 * | 5/2018 | Habib | G02B 5/008 |
| 2018/0327279 | A1 * | 11/2018 | Yu | B01D 1/22 |
| 2020/0101420 | A1 * | 4/2020 | Jang | C02F 1/14 |
| 2020/0109877 | A1 * | 4/2020 | Chen | F24S 10/30 |
| 2020/0324248 | A1 * | 10/2020 | Al-Amri | H02S 40/44 |
| 2020/0399149 | A1 * | 12/2020 | Kim | H01M 8/227 |

* cited by examiner

SOLAR WATER TAKING AND POWER GENERATING DEVICE AND METHOD FOR WATER TAKING AND POWER GENERATING

CROSS REFERENCE TO RELATED APPLICATION

This application claims the priority of Chinese Patent Application No. 201911321803.6, entitled "Solar water taking and power generating device and method for water taking and power generating" filed with the China National Intellectual Property Administration on Dec. 19, 2019, which is incorporated herein by reference in its entirety.

BACKGROUND OF THE INVENTION

The invention relates to the technical field of seawater desalination and power generation, and in particular to a solar water taking and power generating device and a method for water taking and power generating using the same.

With the continuous development of economy and the increasing severity of energy and environmental issues, the society demand for electric power is more and more vigorous, desiring to develop renewable energy power generation technology. On the other hand, many regions still face the trouble of freshwater resources shortage. The utilization of solar energy for power generation can not only relieve the situation that fossil energy is continuously exhausted at present, but also meet the demand for the continuously increased power. In addition, the ocean provides various forms of energy, including salinity gradient energy, wind energy, wave energy, tidal energy and the like, and also is a huge water resource treasury. Seawater desalination is an open source increment technology for seawater resource utilization to obtain freshwater resources which can meet the requirements of human beings. Therefore, it will be a key research direction and an important industrial production technology in the future that based on the utilization of solar heat, the energy stored in ocean is used for seawater desalination and power generation by different means such as a semipermeable membrane and an electrochemical device.

At present, the ways of solar power generation mainly include two types, one is a photo-heat-electricity step-by-step conversion, and the systems operating in this way are for example tower type, groove type and disc type of solar thermal power generating stations, which have quite high construction cost and extremely low power generation efficiency; the other is a photo-electricity direct conversion, and the system operating in this way is for example the photovoltaic cell based on photovoltaic effect, which has been commercially used, but still exists the disadvantages of low efficiency, high pollution, high energy consumption and the like. On the other hand, the mainstream methods for seawater desalination at present mainly comprise two types, one is a reverse osmosis method, which requires a high-pressure equipment, needs to clean the membrane structure regularly, and has a utilization rate of raw water of lower than 80%; the other is a distillation method, which has the disadvantages of the use of complex structure equipment, high operation cost and large occupied area.

Therefore, in order to realize high-efficiency of photo-electricity conversion and simplify the operation process of the seawater desalination system, a plurality of improved schemes have been developed so far. For example, the structure of solar concentrator is reasonably designed to absorb more sunlight, and the control equipment is improved to realize the mutual communication among different processes. However, the above improved schemes have a complicated system, and have a separation between the power generation section and the desalination section, leading to more energy loss, and limiting the efficiency in terms of the energy conversion, the final power generation and seawater desalination.

The above information disclosed in the background section is only for enhancing the understanding of the background of the invention, and therefore it may contain information that does not form the prior art well known to those of ordinary skill in the art.

BRIEF SUMMARY OF THE INVENTION

In view of the above issues, an object of the present invention is to provide a solar water taking and power generating device to overcome the above drawbacks in the prior art, which could simultaneously implement seawater distillation condensation and power generation by the utilization of solar heat, thereby improving the overall utilization efficiency of solar energy. The object of the invention is achieved by the following technical solution.

A solar water taking and power generating device, comprising:

a seawater tank for storing seawater, which is provided with an opening facing sunlight;

a freshwater tank for storing condensed freshwater;

a condensation water taking unit comprising a concentrating-cooling plate for gathering sunlight and at least one freshwater collecting channel formed between the seawater tank and the concentrating-cooling plate, wherein the opening is enclosed by the concentrating-cooling plate, and the freshwater collecting channel is connected to the freshwater tank; and a power generation unit floating on the surface of the seawater, comprising:

a cation exchange membrane comprising a semiconductor film body for generating the photo-Dember effect, nanoparticles provided at a first side of the semiconductor film body facing the concentrating-cooling plate, and a capillary water-transporting conduit for transporting seawater from a second side to the first side, wherein the semiconductor film body is provided with cation-selective channels; and an external circuit comprising a first electrode arranged on the first side and a second electrode arranged on the second side, wherein sunlight irradiates the cation exchange membrane and the nanoparticles through the concentrating-cooling plate, so that the first temperature, the first seawater concentration and the first electric potential of the first side are higher than the second temperature, the second seawater concentration and the second electric potential of the second side, respectively; subsequently, the evaporated seawater enters the freshwater tank through the freshwater collecting channel after being condensed, cations directionally transfer from the first side to the second side through the cation-selective channels to form an ion current, and the electrons of the external circuit transfer from the first electrode to the second electrode to generate a current.

In the solar water taking and power generating device, when the temperature difference between the first temperature and the second temperature, the concentration difference between the first seawater concentration and the second seawater concentration, and/or the potential difference between the first potential and the second potential are within a predetermined range, the cation-selective channels are narrowed to a predetermined threshold range such that only cations can pass through the channels.

In the solar water taking and power generating device, the cation-selective channels comprise a negatively charged surface layer.

In the solar water taking and power generating device, the cation-selective channels are tapered hole or trapezoidal hole channels, which have a diameter of 15-30 nm at the narrowest part, and a diameter of 70-100 nm at the widest part.

In the solar water taking and power generating device, the semiconductor film body is made of carbon nitride or a derivative thereof and has a thickness of not more than 300 mm.

In the solar water taking and power generating device, the nanoparticles is made of the material comprising gold, silver or derivatives thereof, and have a size of 10-100 nm.

In the solar water taking and power generating device, the capillary water-transporting conduit is fixed in a cation-exchange membrane and made of hollow and hydrophilic carbon fiber composite material, and the aperture of single conduit is not more than 0.1 mm.

In the solar water taking and power generating device, the concentrating-cooling plate for transmitting sunlight and cooling water vapor is made of highly light-transmitting resin and has an angle of more than 45 degrees with the horizontal direction.

In the solar water taking and power generating device, the predetermined threshold ranges from 2 nm to 15 nm, and the external circuit comprises a switch, a current measuring unit or a voltage measuring unit.

According to another aspect of the invention, a method for water taking and power generating using the above solar water taking and power generating device comprises the following steps:

the first step: the seawater on the second side is continuously transported to the first side by the capillary force of the capillary water-transporting conduit;

the second step: sunlight irradiates the cation exchange membrane through the concentrating-cooling plate, wherein the nanoparticles on the first side are irradiated to generate localized surface plasmon resonance to absorb solar energy, and the absorbed solar energy is then converted into thermal energy to heat the seawater on the first side and generate steam, and wherein the semiconductor film body is irradiated to generate the photo-Dember effect;

the third step: the steam is condensed by exchanging heat with outside air on the concentrating-cooling plate in the condensation water taking unit to form condensed water, and the obtained condensed water enters a freshwater tank through the freshwater collecting channel to realize condensation water taking, and meanwhile, the first temperature, the first seawater concentration and the first electric potential of the first side are higher than the second temperature, the second seawater concentration and the second electric potential of the second side, respectively; and the fourth step: the cations directionally transfer from the first side to the second side through the cation-selective channels under the combined action of the temperature difference, the concentration difference and the potential difference to form an ionic current, and the electrons of the external circuit transfer from the first electrode to the second electrode to generate a current.

Compared with the prior art, the invention has the following beneficial effects:

Based on the utilization of solar heat, seawater distillation condensation and power generation system are integrated together in the invention by means of structures such as a condensation water taking unit and a power generating unit, synchronously realizing seawater desalination and power generation; moreover, power generation efficiency is significantly improved under the combined action of the temperature difference, the concentration difference and the potential difference. The invention can continuously output freshwater and electric energy, effectively simplify the operation processes of two single-function systems, and improve the overall utilization efficiency of solar energy. In view of this, the invention has significant social benefit and economic benefit, and can be widely applied to the fields of seawater desalination and salt difference power generation.

The above description is only an overview of the technical solutions of the present invention. The following description is given by way of example of the specific embodiments of the present invention to make the technical means of the present invention clearer and more understandable, enable those skilled in the art to implement the content of the description, and make the above and other objects, features and advantages of the present invention more obvious and easier to be understood.

BRIEF DESCRIPTION OF THE DRAWINGS

Various other advantages and benefits of the present invention will become apparent to those of ordinary skill in the art upon reading the following detailed description of the preferred embodiments. The drawings are only for purposes of illustrating the preferred embodiments and should not be construed as a limitation to the invention. It is obvious that the drawings described below are only some embodiments of the invention, and other drawings can be derived from them without inventive effort for a person skilled in the art. Also, the same parts are denoted by the same reference numerals throughout the drawings.

Figure 1:
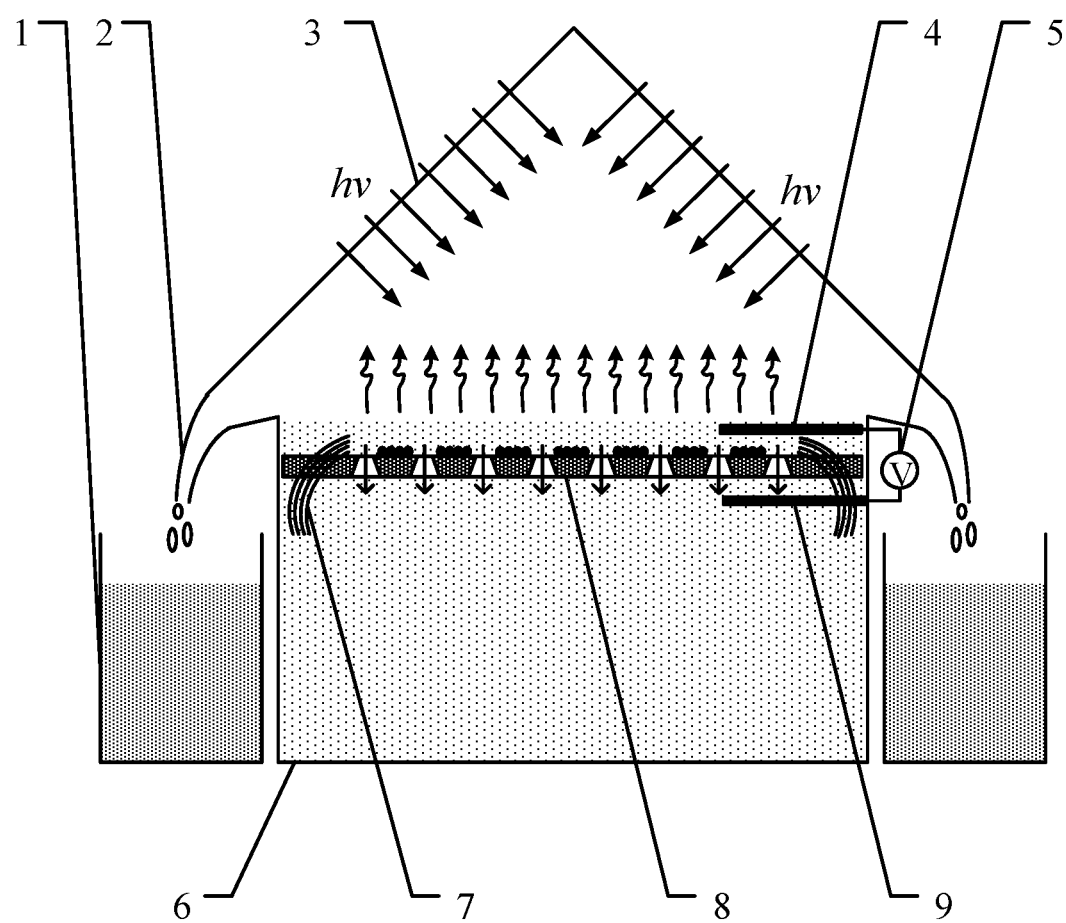
FIG. 1 is a structural diagram of a solar water taking and power generating device according to an embodiment of the present invention.

The invention is further explained below with reference to the figures and examples.

DETAILED DESCRIPTION OF THE EMBODIMENTS

Specific embodiments of the present invention will be described in more detail below with reference to drawings. Although specific embodiments of the invention are shown in the drawings, it should be understood that the invention may be embodied in various forms and should not be limited by the embodiments set forth herein. On the contrary, these embodiments are provided so that this disclosure will be thoroughly and completely understood, and the scope of the invention could be fully conveyed to those skilled in the art.

It should be noted that in the context of the present description and claims, certain terms are used to refer to particular components. As one skilled in the art will appreciate, various terms may be used to refer to the same component. The present description and claims do not use differences in terms as a way to distinguish components, but rather differences in functions of components as criteria for distinguishing. For example, in the context of the present description and claims, the terms "include" and "comprise" are open-ended, and thus should be interpreted to mean "include, but not limited to". The following description is a preferred embodiment of the invention, and is made for the purpose of illustrating the general principles of the invention but not for the purpose of limiting the scope of the invention. The scope of the present invention is defined by the appended claims.

For the purpose of facilitating understanding of the embodiments of the present invention, the following description will be made by taking specific embodiments as examples with reference to the accompanying drawings, and the drawings are not to be construed as limiting the embodiments of the present invention.

For a better understanding, as shown in FIG. 1, a solar water taking and power generating device comprises:

a seawater tank 6 for storing seawater, which is provided with an opening facing sunlight;

a freshwater tank 1 for storing the condensed freshwater;

a condensation water taking unit comprising a concentrating-cooling plate 3 for gathering sunlight and at least one freshwater collecting channel 2 formed between the seawater tank 6 and the concentrating-cooling plate 3, wherein the opening is enclosed by the concentrating-cooling plate 3, and the freshwater collecting channel 2 is connected to the freshwater tank 1; and a power generation unit floating on the surface of the seawater, comprising:

a cation exchange membrane 8 comprising a semiconductor film body 11 for generating the photo-Dember effect, nanoparticles 10 provided at a first side of the semiconductor film body 11 facing the concentrating-cooling plate 3, and a capillary water-transporting conduit 7 for transporting seawater from a second side to the first side, wherein the semiconductor film body 11 is provided with cation-selective channels 12; and an external circuit 5 comprising a first electrode 4 arranged on the first side and a second electrode 9 arranged on the second side, wherein sunlight irradiates the cation exchange membrane 8 and the nanoparticles 10 through the concentrating-cooling plate 3, so that the first temperature, the first seawater concentration and the first electric potential of the first side are higher than the second temperature, the second seawater concentration and the second electric potential of the second side, respectively; subsequently, the evaporated seawater enters the freshwater tank 1 through the freshwater collecting channel 2 after being condensed, cations directionally transfer from the first side to the second side through the cation-selective channels 12 to form an ion current, and electrons of the external circuit 5 transfer from the first electrode 4 to the second electrode 9 to generate a current.

The material of the invention can generate the photo-Dember effect when being subjected to asymmetric illumination. For example, when carbon nitride or its derivative is subjected to asymmetric illumination, photogenerated electrons and holes in illuminated area can diffuse to non-illuminated area under the drive of respective density gradients, and the material generates charge redistribution to form a potential difference due to the fact that the diffusivity and the mobility of electrons are higher than that of holes, so that the potential of the illuminated area is higher than that of the non-illuminated area. Although the photoelectric conversion capability of the photo-Dember effect is influenced by factors such as illumination sites, illumination intensity and the like, the generated potential difference spanning hundreds of nanometers can be utilized to drive cations to directionally transfer from illumination side to non-illumination side through the membrane, and the power generation efficiency is remarkably improved under the combined action of the temperature difference, the concentration difference and the potential difference.

In a preferred embodiment of the solar water taking and power generating device, when the temperature difference between the first temperature and the second temperature, the concentration difference between the first seawater concentration and the second seawater concentration, and/or the potential difference between the first potential and the second potential are within a predetermined range, the cation-selective channels 12 are narrowed to a predetermined threshold range so that only cations can pass through the channels.

In a preferred embodiment of the solar water taking and power generating device, the cation-selective channels 12 comprises a negatively charged surface layer.

In a preferred embodiment of the solar water taking and power generating device, the cation-selective channels 12 are tapered hole or trapezoidal hole channels, which have a diameter of 15-30 nm at the narrowest part and a diameter of 70-100 nm at the widest part.

In a preferred embodiment of the solar water taking and power generating device, the semiconductor film body 11 is made of carbon nitride or a derivative thereof, and has a thickness of not more than 300 mm.

In a preferred embodiment of the solar water taking and power generating device, the nanoparticles 10 is made of the material comprising gold, silver or derivatives thereof, and have a size of 10-100 nm.

In a preferred embodiment of the solar water taking and power generating device, the capillary water-transporting conduit 7 is fixed in the cation exchange membrane and made of hollow and hydrophilic carbon fiber composite materials, and the aperture of the single conduit 7 is not more than 0.1 mm.

In a preferred embodiment of the solar water taking and power generating device, the concentrating-cooling plate 3 for transmitting sunlight and cooling water vapor is made of high light-transmitting resin, and has an angle of more than 45 degrees with the horizontal direction.

In a preferred embodiment of the solar water taking and power generating device, the predetermined threshold ranges from 2 nm to 15 nm, and the external circuit comprises a switch, a current measuring unit or a voltage measuring unit.

In a preferred embodiment of the solar water taking and power generating device, the concentrating-cooling plate 3 is in a triangular structure.

In a preferred embodiment of the solar water taking and power generating device, the concentrating-cooling plate 3 and the openings form an equilateral triangle structure.

In a preferred embodiment of the solar water taking and power generating device, the opening is arranged on the side with the largest size in the seawater tank.

For a further understanding of the present invention, in one embodiment, a solar water taking and power generating device comprises, a seawater tank 6 for storing seawater, a fresh water tank 1 for storing the condensed freshwater, a condensation water taking unit comprising a concentrating-cooling plate 3 and a freshwater collecting channel 2, a power generation unit comprising an external circuit 5, a cation exchange membrane 8, a first electrode 4 arranged on the upper side of the cation exchange membrane and a second electrode 9 arranged on the lower side of the cation exchange membrane.

In an embodiment, the concentrating-cooling plate 3 is made of high light-transmitting resin, has an angle of more than 45 degrees with the horizontal direction, and is used for transmitting sunlight and cooling water vapor.

Figure 2:
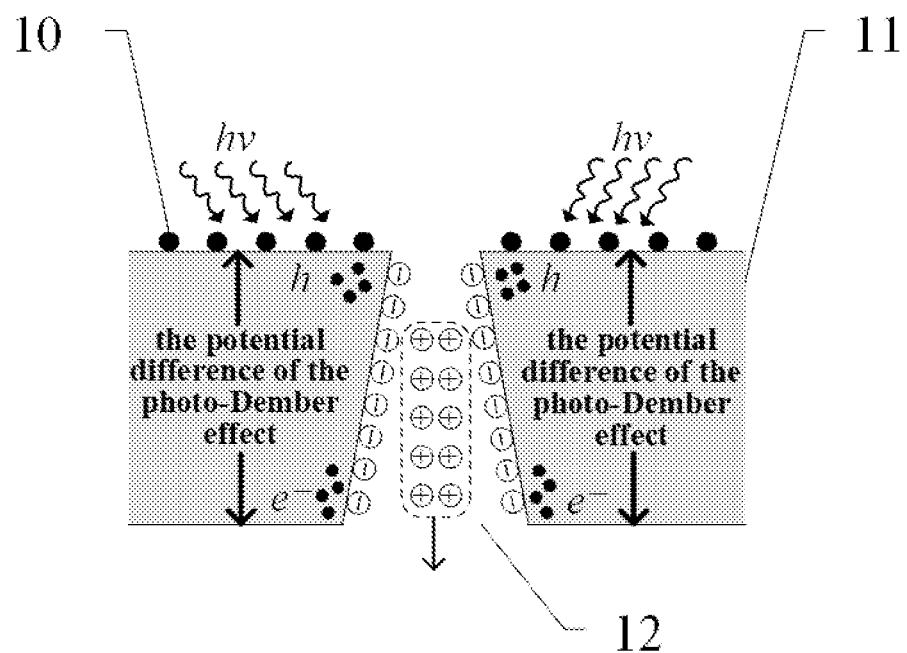
FIG. 2 is a schematic diagram of a cation exchange membrane in a solar water taking and power generating device according to an embodiment of the present invention.

In a preferred embodiment, as shown in FIG. 2, the cation exchange membrane 8 comprises a semiconductor film body 11, nanoparticles 10 embedded on the upper side of the membrane, cation-selective channels 12 and capillary water-transporting conduits 7 for continuously transporting water.

In an embodiment, in the method for condensation water taking and power generating with solar evaporated seawater, the capillary water-transporting conduit 7 is fixed in the cation exchange film body 11 and made of hollow and hydrophilic carbon fiber composite materials, and the aperture of a single conduit is not more than 0.1 mm.

Based on the functional characteristics in terms of high selectivity of a cation exchange membrane, photo-thermal effect of nanoparticles, photo-Dember effect of a semiconductor film, and high water transporting rate of a capillary water-transporting conduit and the like, the invention simultaneously realizes seawater desalination and salinity gradient energy power generation, effectively simplifies the operation processes of two single-function systems and improves overall utilization efficiency of solar energy.

Figure 3:
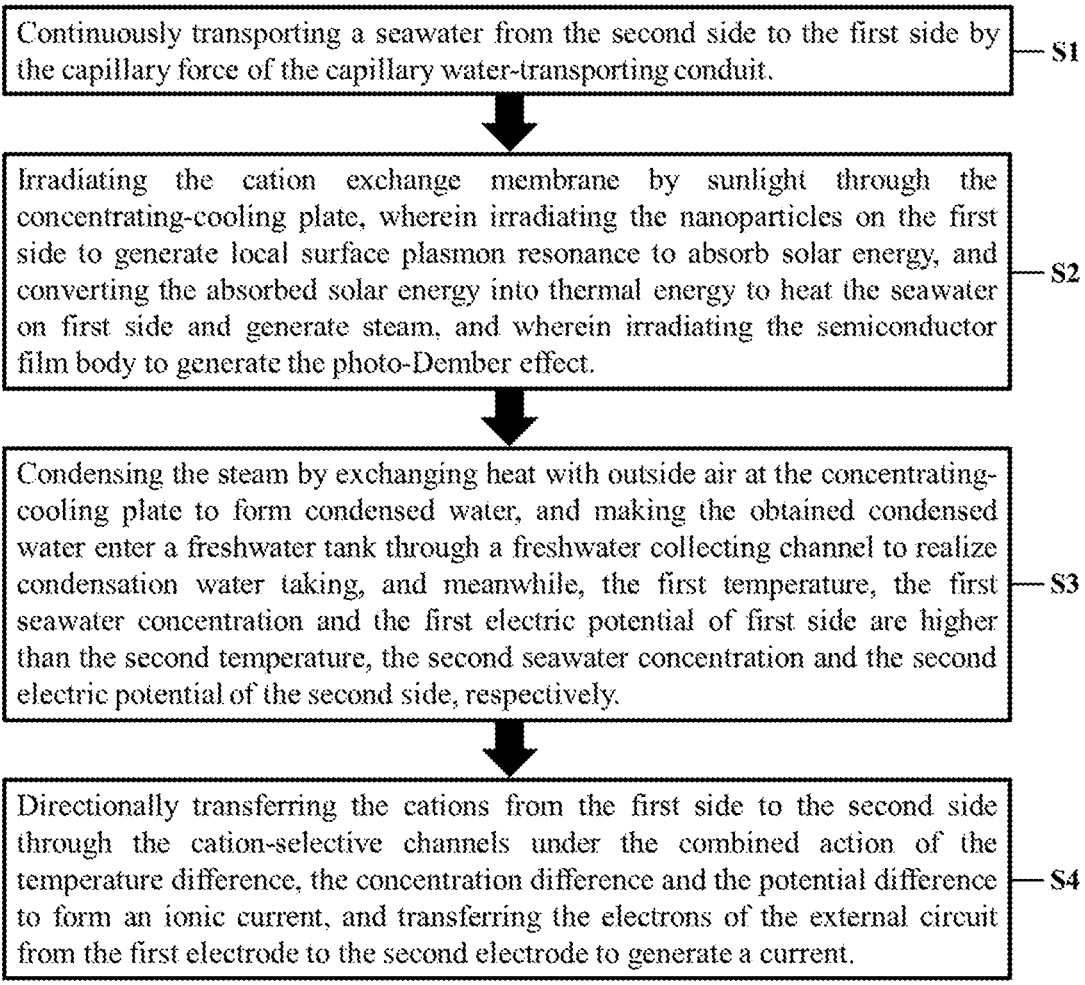
FIG. 3 is a schematic diagram of the water taking and power generating steps according to an embodiment of the present invention.

As shown in FIG. 3, a method for water taking and power generating using the solar water taking and power generating device comprises the following steps:

the first step S1: the seawater on the second side is continuously transported to the first side by the capillary force of the capillary water-transporting conduit 7;

the second step S2: sunlight irradiates the cation exchange membrane through the concentrating-cooling plate 3, wherein the nanoparticles 10 on the first side are irradiated to generate localized surface plasmon resonance to absorb solar energy, and the absorbed solar energy is converted into thermal energy to heat the seawater on the first side to generate steam, and wherein the semiconductor film body 11 is irradiated to generate the photo-Dember effect;

the third step S3: the steam is condensed by exchanging heat with outside air at the concentrating-cooling plate 3 to form condensed water, and the obtained condensed water enters a freshwater tank 1 through a freshwater collecting channel 2 to realize condensation water taking, and meanwhile, the first temperature, the first seawater concentration and the first electric potential of the first side are higher than the second temperature, the second seawater concentration and the second electric potential of the second side, respectively; and the fourth step S4: under the combined action of the temperature difference, the concentration difference and the potential difference, the cations directionally transfer from the first side to the second side through the cation-selective channels 12 to form an ionic current, and electrons of the external circuit 5 transfer from the first electrode 4 to the second electrode 9 to generate a current.

In a preferred embodiment, the method for water taking and power generating comprises the following steps:

the first step S1: seawater is continuously transported to the upper side of the cation exchange membrane 8 by the capillary force of the capillary water-transporting conduit 7;

the second step S2: sunlight irradiates the cation exchange membrane 8 through the concentrating-cooling plate, wherein the nanoparticles 10 embedded on the upper side of the film body 11 are irradiated to generate local surface plasmon resonance to absorb solar energy, and the absorbed solar energy is converted into heat energy to heat the seawater above the film body 11 to generate steam; in addition, and wherein the semiconductor film body 11 is irradiated to generate the photo-Dember effect to absorb solar energy, and the absorbed solar energy is converted into the potential difference, resulting in that the potential on the upper side of the film body 11 is higher than that on its lower side;

the third step S3: the steam is condensed by exchanging heat with the outside air at the high light-transmitting cooling plate 3 in the condensation water-taking unit to form condensed water, and the obtained condensed water enters the freshwater tank 1 through the freshwater collecting channel 2 to realize condensation water taking; and the fourth step S4: the evaporation causes a concentration difference between the remaining high-concentration seawater above the film body 11 and the seawater below the film body 11, and under the combined action of the concentration difference and the potential difference at the two sides of the film body 11, cations can transfer from the high concentration seawater into the normal seawater in an accelerated and directional manner through the cation-selective channels 12 to form an ionic current, and in order to maintain electrical neutrality, electrons of the external circuit 5 transfer from the first electrode 4 to the second electrode 9, thereby realizing power generation.

In a preferred embodiment, sunlight irradiates the nanoparticles and the semiconductor film body through the concentrating-cooling plate, seawater above the membrane is heated by the photothermal effect of the nanoparticles to generate steam, the obtained steam is condensed by the water taking unit to form freshwater, the salt concentration difference generated by evaporation between the seawater on two sides of the membrane can be used for power generation by the electrode plates on two sides of the membrane and the external circuit, and during this process, the potential difference generated by the photo-Dember effect of the semiconductor film body between two sides of the membrane can accelerate cation in the membrane.

The invention utilizes solar energy to realize seawater desalination and salinity gradient power generation, improving system compactness and overall utilization efficiency of energy resources. It has a broadly applied foreground in the fields of seawater desalination and power generation.

INDUSTRIAL APPLICABILITY

The solar water taking and power generating device and the method for water taking and power generating can be manufactured and used in the fields of seawater desalination and power generation.

The foregoing describes the general principles of the present application combined with specific embodiments; however, it is noted that the advantages, effects and the like mentioned in the present application are merely for the purpose of the exemplification rather than limitation, and they should not be considered essential to each embodiment of the present application. Furthermore, the specific details disclosed above are for the purpose of illustration and understanding but not limitation because the details above are not intended to limit the disclosure to the precise details disclosed. [84] The foregoing description has been provided for the purpose of exemplification and illustration. Furthermore, the description is not intended to limit embodiments of the application to the form disclosed herein. While a number of exemplary aspects and embodiments have been discussed above, those skilled in the art will recognize certain variations, modifications, alterations, additions and sub-combinations thereof

What is claimed is:

1. A solar water taking and power generating device, comprising:
    a seawater tank for storing seawater, which is provided with an opening facing sunlight;
    a fresh water tank for storing the condensed freshwater;
    a condensation water taking unit comprising a concentrating-cooling plate for gathering sunlight and at least one freshwater collecting channel formed between the seawater tank and the concentrating-cooling plate, wherein the opening is enclosed by the concentrating-cooling plate, and the freshwater collecting channel is connected to the freshwater tank; and,
    a power generation unit floating on the surface of the seawater, comprising,
    a cation exchange membrane comprising a semiconductor film body for generating the photo-Dember effect, nanoparticles provided at a first side of the semiconductor film body facing the concentrating-cooling plate, and a capillary water-transporting conduit for transporting seawater from a second side to the first side, wherein the semiconductor film body is provided with cation-selective channels; and
    an external circuit comprising a first electrode arranged on the first side and a second electrode arranged on the second side, wherein sunlight irradiates the cation exchange membrane and the nanoparticles through the concentrating-cooling plate, so that the first temperature, the first seawater concentration and the first electric potential of the first side are higher than the second temperature, the second seawater concentration and the second electric potential of the second side, respectively; subsequently, the evaporated seawater enters the freshwater tank through the freshwater collecting channel after being condensed, cations directionally transfer from the first side to the second side through the cation-selective channels to form an ion current, and electrons of the external circuit transfer from the first electrode to the second electrode to generate a current.

2. A solar water taking and power generating device as claimed in claim 1, wherein when the temperature difference between the first temperature and the second temperature, the concentration difference between the first seawater concentration and the second seawater concentration, and/or the potential difference between the first potential and the second potential are within a predetermined range, the cation-selective channels are narrowed to a predetermined threshold range such that only cations pass through the channel.

3. A solar water taking and power generating device as claimed in claim 1, wherein the cation-selective channels comprise a negatively charged surface layer.

4. A solar water taking and power generating device as claimed in claim 1, wherein the cation-selective channels are tapered hole or trapezoidal hole channels, which have a diameter of 15-30 nm at the narrowest part and a diameter of 70-100 nm at the widest part.

5. A solar water taking and power generating device as claimed in claim 1, wherein the semiconductor film body is made of carbon nitride or a derivative thereof, and has a thickness of not more than 300 mm.

6. A solar water taking and power generating device as claimed in claim 1, wherein the nanoparticles is made of the material comprising gold, silver or derivatives thereof, and have a size of 10-100 nm.

7. A solar water taking and power generating device as claimed in claim 1, wherein the capillary water-transporting conduit is fixed in a cation-exchange membrane and made of hollow and hydrophilic carbon fiber composite material, and the aperture of single conduit is not more than 0.1 mm.

8. A solar water taking and power generating device as claimed in claim 1, wherein the concentrating-cooling plate for transmitting sunlight and cooling water vapor is made of highly light-transmitting resin and has an angle of more than 45 degrees with the horizontal direction.

9. A solar water taking and power generating device as claimed in claim 2, wherein the predetermined threshold ranges from 2 nm and 15 nm, and the external circuit comprises a switch, a current measuring unit or a voltage measuring unit.

10. A method for water taking and power generating using the solar water taking and power generating device as claimed claim 1, comprising the following steps:
    the first step: continuously transporting a seawater on the second side to the first side by the capillary force of the capillary water-transporting conduit;
    the second step: irradiating the cation exchange membrane by sunlight through the concentrating-cooling plate, wherein irradiating the nanoparticles on the first side to generate local surface plasmon resonance to absorb solar energy, and converting the absorbed solar energy into thermal energy to heat the seawater on the first side and generate steam, and wherein irradiating the semiconductor film body to generate the photo-Dember effect;
    the third step: condensing the steam by exchanging heat with outside air at the concentrating-cooling plate to form condensed water, and making the obtained condensed water enter a freshwater tank through a freshwater collecting channel to realize condensation water taking, and meanwhile, the first temperature, the first seawater concentration and the first electric potential of the first side are higher than the second temperature, the second seawater concentration and the second electric potential of the second side, respectively; and
    the fourth step: directionally transferring the cations from the first side to the second side through the cation-selective channels under the combined action of the temperature difference, the concentration difference and the potential difference to form an ionic current, and transferring the electrons of the external circuit from the first electrode to the second electrode to generate a current.

* * * * *